Nov. 15, 1960 E. H. HARTEL 2,960,288
RETRACTABLE LANDING GEAR
Filed Jan. 28, 1958 4 Sheets-Sheet 1
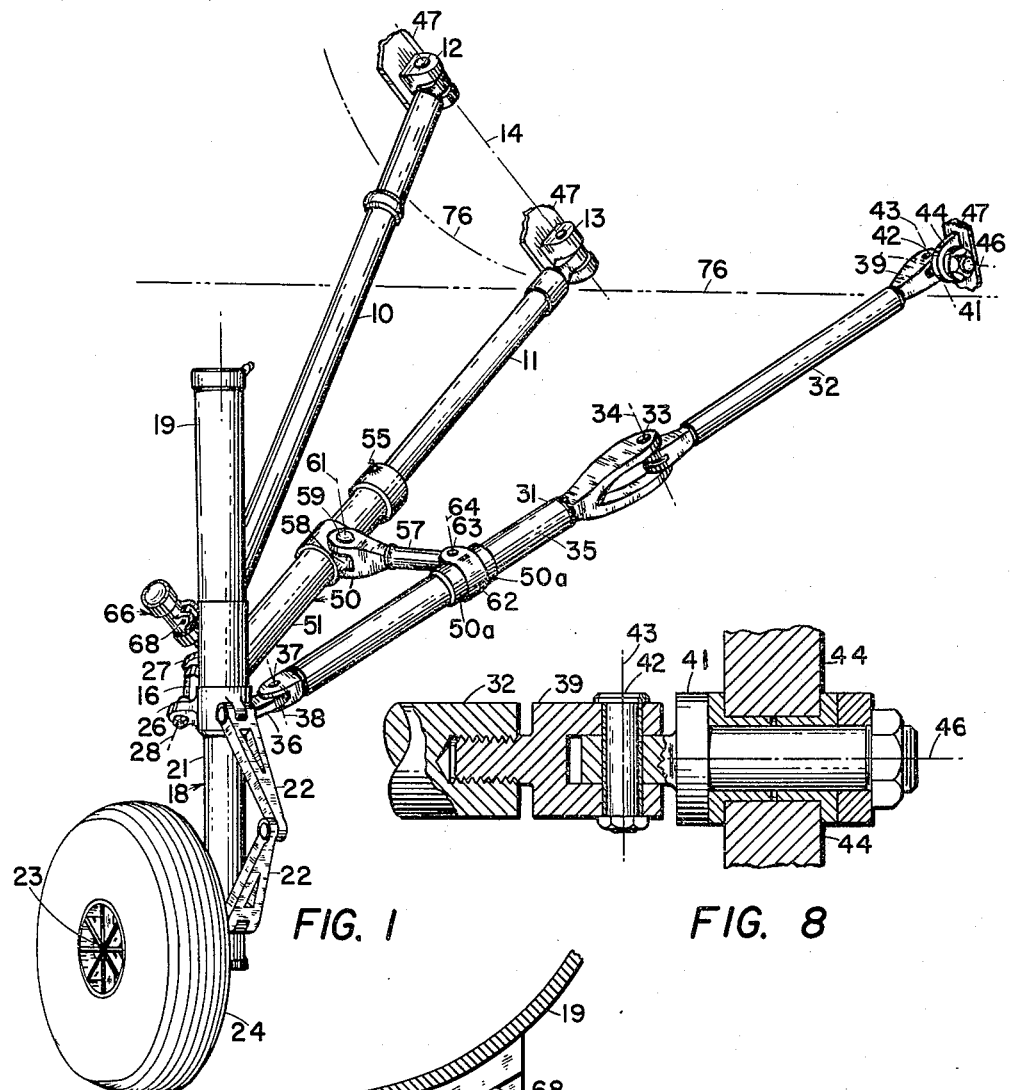
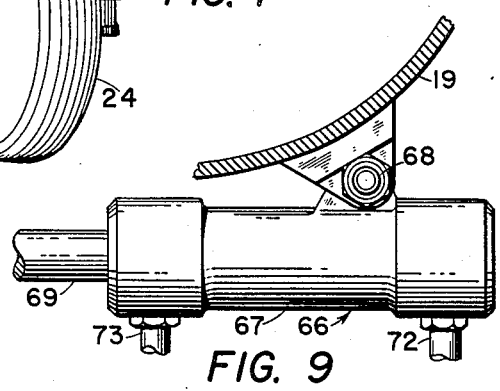
INVENTOR.
ERWIN H. HARTEL
BY
ATTORNEY

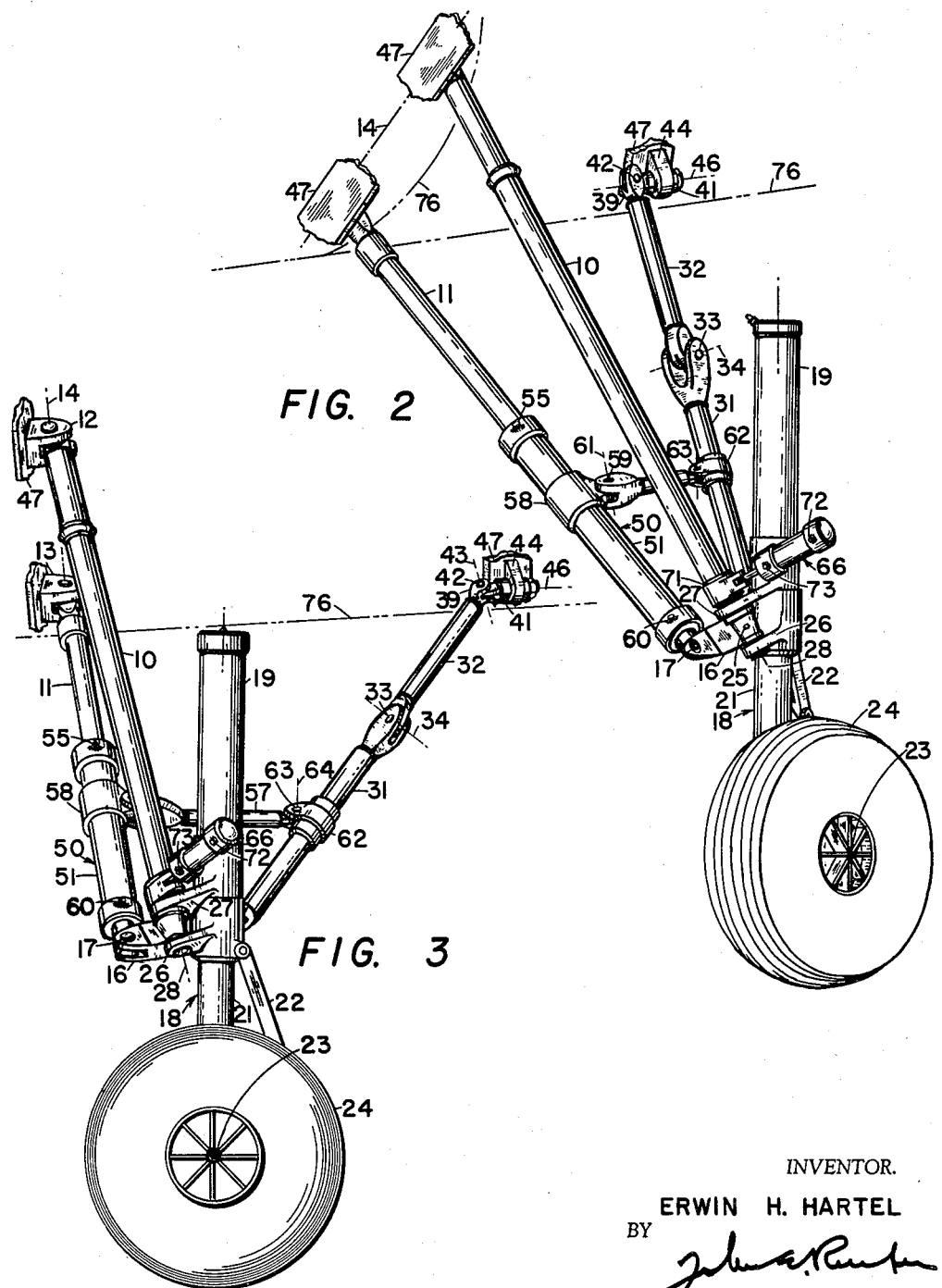

Nov. 15, 1960  E. H. HARTEL  2,960,288
RETRACTABLE LANDING GEAR
Filed Jan. 28, 1958  4 Sheets-Sheet 3

INVENTOR.
ERWIN H. HARTEL
BY
ATTORNEY

Nov. 15, 1960 — E. H. HARTEL — 2,960,288
RETRACTABLE LANDING GEAR
Filed Jan. 28, 1958 — 4 Sheets-Sheet 4

INVENTOR.
ERWIN H. HARTEL
ATTORNEY

United States Patent Office 2,960,288
Patented Nov. 15, 1960

2,960,288

RETRACTABLE LANDING GEAR

Erwin H. Hartel, Cleveland, Ohio, assignor to The Cleveland Pneumatic Tool Company, Cleveland, Ohio, a corporation of Ohio Filed Jan. 28, 1958, Ser. No. 711,648

12 Claims. (Cl. 244—102)

This invention relates to aircraft landing gears in general and more particularly to a new and improved retraction system for laterally extending landing gears.

It is an important object of this invention to provide a landing gear retraction system which enables the stowage of the retracted landing gear in a small area.

It is another important object of this invention to provide a landing gear retraction system wherein the landing wheel is rotated during retraction so that it will fit along the contour of the aircraft.

It is still another object of this invention to provide an actuating mechanism for retracting aircraft landing gears and the like which utilizes pivotally connected drag links wherein the retraction force moment has a component within the plane of the axis of the pivot connections.

It is still another object of this invention to provide a landing gear retraction system wherein the cylinder of a retraction actuator envelops one of the strut members and is axially movable thereon to produce retraction.

It is still another object of this invention to provide a retraction system for aircraft landing gears wherein the line of action of a retraction actuator is perpendicular to the link operated thereby when the landing gear is in an extended position to provide an automatic downlock mechanism.

Further objects and advantages will appear from the following description and drawings wherein:

Figure 1 is a side elevation of the preferred landing gear according to this invention as viewed from the rearward side thereof showing the gear in the extended position;

Figure 2 is a side elevation as viewed from the forward side of the gear showing the elements in the extended position;

Figure 3 is a side elevation taken in a plane parallel to the landing wheel showing the elements in the extended position;

Figure 8 is an enlarged fragmentary view of the swivel connection between the upper drag link and the frame of the aircraft; and Figure 9 is a view taken generally along 9—9 of Figure 7 with parts removed to clearly show the mounting of the smaller actuator.

Figure 4:
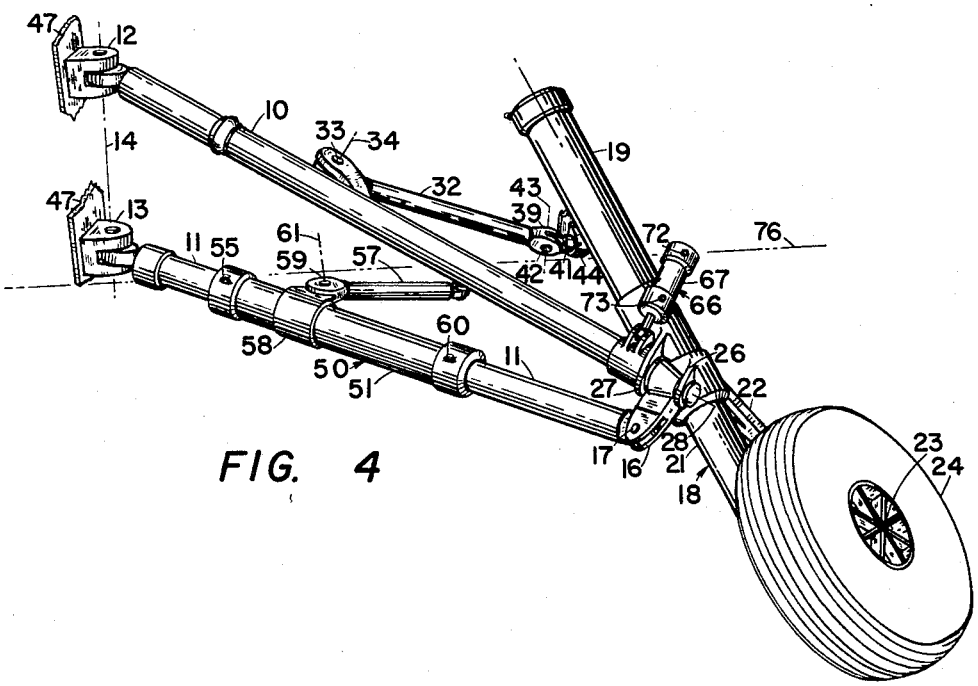
Figure 4 is a side elevation showing the position the elements assume in an intermediate retracted position.

In the past it has been customary to retract landing gears into the wing of the aircraft. However, this has become increasingly difficult since the thickness of the aircraft wing has decreased as the speed of the aircraft has increased to the point where it is often impossible to store the landing gear within this area. It is even difficult to store the retracted landing gear in the fuselage of the modern high-speed aircraft because the equipment density in such aircraft has increased tremendously. The use of jet engines even complicates the problem since the jet engines tend to fill the longitudinal cavity of the aircraft making it necessary to store the retracted landing gear in a relatively thin envelope adjacent to the side of the fuselage. A landing gear according to this invention enables the retraction of the landing gear into a relatively small storage envelope in the fuselage of the aircraft and, in addition, the landing wheel is automatically turned during the retraction movement so that it tends to conform to the envelope of the aircraft fuselage.

When a landing gear is stored in the fuselage it is necessary to use a geometry wherein the gear extends downwardly and laterally from the fuselage so that a sufficiently wide wheel tread will be provided. In the landing gear shown there are two main struts 10 and 11 which are pivoted on spaced hinges 12 and 13 respectively which are affixed on the frame of the aircraft fuselage. Both of the hinges 12 and 13 are arranged so that they have the same hinge axis 14 which is inclined relative to the vertical and contained in a plane perpendicular to the longitudinal axis of the fuselage. The two struts 10 and 11 converge to their lower ends and are pivotally connected by a connecting member 16 mounted on the lower end of the strut 10 and a pin 17 extending through the connecting member 16 and through the lower end of the strut 11. The two struts 10 and 11 cooperate through their connections to act as a unitary member and they move around axis 14 in unison. The two separate struts mounted as above described result in a structure which provides adequate load-carrying ability without excess of weight.

Figure 7:
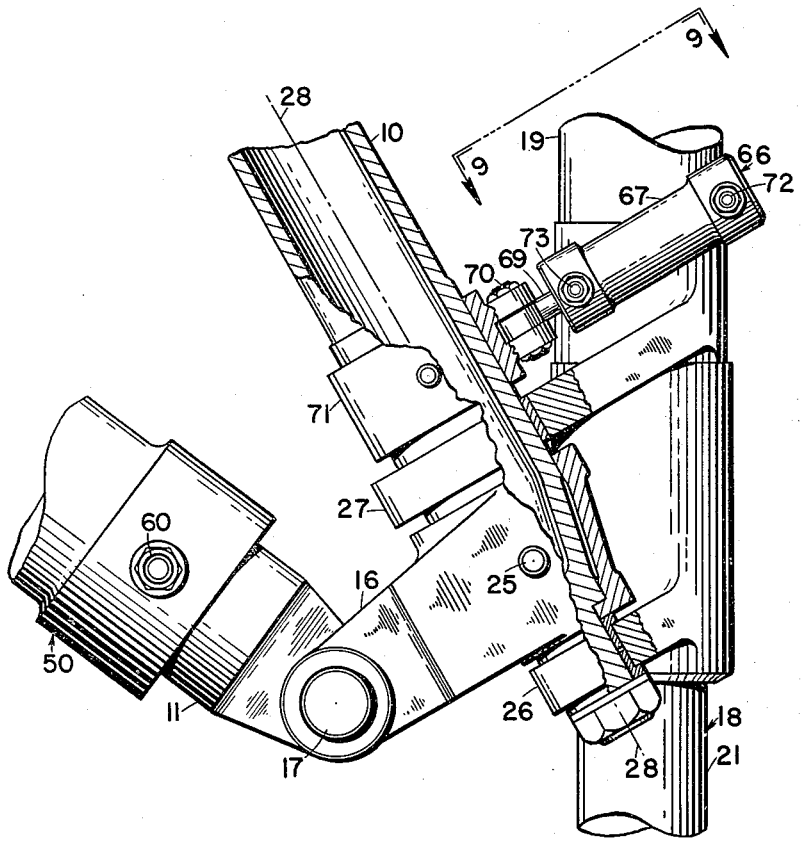
Figure 7 is a longitudinal section of the connection between the two struts.

A shock absorbing wheel support assembly 18 is carried by the two struts 10 and 11 and includes a cylinder 19 into which a piston 21 is axially movable. The cylinder 19 and the piston 21 cooperate to form the normal shock absorbing spring structure commonly used in aircraft landing gears, and since the exact spring and shock absorbing structure is not critical to this invention, it has not been shown in detail. Torque arms 22 are connected between the cylinder 19 and the piston 21 to prevent relative rotation therebetween while permitting relative axial movement and the piston 21 is provided with an axle 23 at its lower end on which is journalled a landing wheel 24. As shown in Figure 7, the member 16 connecting the lower ends of the struts 10 and 11 is rotationally fixed on the lower end of the strut 10 by a cross pin 25 and the cylinder 19 above and below the connecting member 16 is journalled for rotation around the axis 28 of the strut 10 within adequate bearings provided within spaced lugs 26 and 27 formed as integral parts of the lower end of the cylinder 19.

To prevent rotation of the two struts 10 and 11 around axis 14 when the landing gear is in the extended position, I utilize two drag links 31 and 32 which are pivotally connected together by a pivot pin 33 for relative rotation around a pivot axis 34. The drag link 31 has its outer end pivotally connected to a lug 36, shown in Figure 1, formed as an integral part of the lower end of the cylinder 19, by a pivot pin 37 for rotation relative thereto about a pivot axis 38. As shown in Figure 8, the drag link 32 is provided with a swivel member 39 threaded into the link 32 so that it is rotatable relative thereto around its longitudinal axis, which swivel is in turn pivotally connected to a bearing member 41 by a pivot pin 42 for rotation around a pivot axis 43. The bearing member 41 is journalled in a bearing pad 44 for rotation around an axis 46, and the bearing pad is affixed on the frame of the aircraft fuselage. It should be understood that since the frame of the aircraft fuselage forms no part of this invention excepting that it must be arranged and stressed so that it provides adequate support for the landing gear, the frame is only shown schematically at 47 wherein it supports the bearing pad 44 and the hinges 12 and 13.

Figure 6:
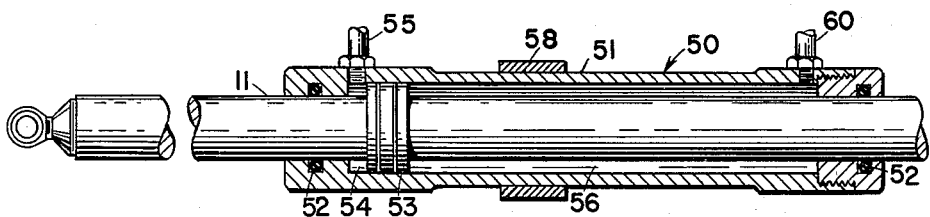
Figure 6 is a fragmentary longitudinal section of one of the retraction actuators showing the structural details thereof.

In order to provide the retraction of the landing gear, two actuators 50 and 66 are utilized; the actuator 50 is shown in detail in Figure 6. This actuator actually forms a part of the strut 11 and includes a cylinder 51 axially movable on the strut 11. The cylinder 51 is provided with a gland 52 at each end in sealing engagement with the strut 11 and the strut 11 is provided with an intermediate piston portion 53. The piston portion 53 cooperates with the two glands 52 to divide the cylinder 51 into a first chamber 54 and a second chamber 56. When the first chamber 54 is connected to a source of pressure fluid through a pressure line 55 and the second chamber 56 is connected to the reservoir return on the aircraft through a pressure line 60, the cylinder 51 moves to the left (as viewed in Figure 6) relative to the strut 11. Conversely, when the opposite fluid connections are made, the cylinder 51 moves to the right relative to the strut. Therefore, the strut 11 is in effect a piston for the cylinder 51 and the cylinder is movable thereaiong.

A connecting link 57 is pivotally connected to a lug 58 formed as an integral part of the cylinder 51 by a pivot pin 59 for relative rotation around a pivot axis 61 located in a plane perpendicular to the longitudinal axis of the strut 11. The other end of the connecting link 57 is pivotally connected to a collar 62 by a pivot pin 63 for rotation around a pivot axis 64. The collar 62 is in turn axially fixed on the drag link 31 and journalled for rotation relative thereto around the longitudinal axis thereof between two retaining members 50a. As shown in Figure 9, the second actuator 66 includes a cylinder 67 pivotally connected to the cylinder 19 by a pivot pin 68 and a piston 69 pivotally connected by a pivot pin 70 to a collar 71 fixed on the strut 10. In this case the actuator 66 includes the normal piston and cylinder structure wherein fluid under pressure supplied to one end of the actuator through a pressure line 72 produces extension of the cylinder when the other pressure line 73 is connected to the reservoir return. The opposite fluid connections, of course, cause movement of the piston 69 into the cylinder 67.

When the landing gear is in the extended position the cylinder 51 of the first actuator 50 is at its bottom position along the strut 11 and the various elements are arranged so that the connecting link 57 maintains the drag links 31 and 32 in alignment. The axes 34 and 38 are non-parallel relative to the longitudinal axis 28 of the strut 10 so the wheel support assembly 18 is prevented from rotating around the longitudinal axis 28. I prefer to arrange the connecting link 57 so that it extends substantially perpendicular to the axis of the actuator 50 when the elements are in the extended position so that any tension or compression forces in the connecting link 57 will not produce a component of force which would tend to cause the cylinder 51 to move along the strut 11, thereby eliminating the necessity of providing a separate downlock.

When it is desired to retract the landing gear, fluid under pressure is supplied to the pressure lines 55 of the actuator 50 and 72 of the actuator 66, and at the same time the pressure lines 60 of the actuator 50 and 73 of the actuator 66 are connected to the reservoir. Initially the second actuator 66 does not produce movement between the various elements but the cylinder 51 commences the retraction by moving upwardly along the strut 11. This causes the drag link 31 to be moved toward the strut 11 or to the intermediate position shown in Figure 4, thereby reducing the distance between the outer ends of the drag links 31 and 32 and causing the landing gear to assume an approximately half-retracted position. Because the first actuator 50 produces tension in the connecting link 57 as it moves up the strut 11, its ability to produce folding tends to decrease as the drag link 31 and the connecting link 57 approach an aligned position. For this reason this actuator is incapable of fully retracting the landing gear. However, as the elements move to the position of Figure 4, the second actuator 66 extends to produce a force moment tending to rotate the wheel assembly 18 relative to the strut 10 around the longitudinal axis 28. This force moment is transmitted by the connection of the pivot pin 37 to the drag link 31 and in turn by the pivot pin 33 to the drag link 32. From the drag link 32 it produces a reaction on the frame of the aircraft at the bearing pad 44. It is possible to transmit this force moment through the pivotal connections because the axes 34 and 38 are contained in a plane having a component of the force moment. The force moment created by the actuator 66 produces rotation of the wheel support assembly 18 around the longitudinal axis 28 and, as mentioned previously, a force reaction on the bearing pad 44 which causes the landing gear to move from the intermediate position of Figure 4 to the fully retracted position of Figure 5. By comparing Figures 4 and 5 it is apparent that the wheel support assembly 18 rotates along the longitudinal axis 28 of the strut 10 as shown by the position of the wheel 24. Also, an inspection of Figure 5 will show that the connecting link 57 is substantially aligned with the drag link 31 in the retracted position so that the first actuator 50 would be incapable of producing sufficient torques to cause the full retraction of the mechanism. It is not necessary to arrange the structure so that the pivot axes 34 and 38 are parallel to each other as long as the axis 38 is non-parallel relative to the longitudinal axis 28 of the strut 10 and the axis 34 is not perpendicular to a plane containing the axis 28 and the longitudinal axis 35 of the link 31. Those skilled in the art will recognize that the pivot pin 37 can transmit force moments or torque only in a plane containing the axis 38 and that the pin 33 can transmit a force moment in a plane containing the axis 34. Therefore, a force moment will be transmitted to the link 32 only if the axis 34 is not perpendicular to a plane containing the axis 37 and the longitudinal axis 35 of the link 31, and if the axis 38 is not parallel to the axis 28. In the particular embodiment shown, the axes 34 and 38 are made non-parallel relative to each other and relative to the axis 28 so that the drag links 31 and 32 will fold into a position where there will be no interference with the other elements of the landing gear in the retracted position. An up lock would be provided to hold the landing gear in the retracted position, but since it forms no part of this invention, it has not been shown.

Figure 5:
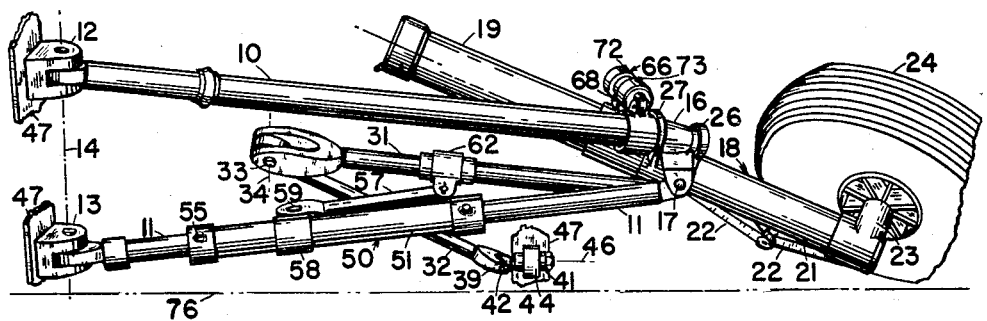
Figure 5 is a view similar to Figure 4 showing the position the elements assume in a fully retracted position.

The envelope of the fuselage is shown schematically by the phantom lines 76 and is apparent from an inspection of Figure 5 that the wheel 24 tends to conform to the fuselage envelope in the fully retracted position and does not require a deep storage area. Those skilled in the art will recognize that the use of the second actuator 66 which produces rotation of the wheel support around the longitudinal axis 28 accomplishes a dual function, the first being to produce retraction in the range where the first actuator is incapable of producing sufficient torque, and the second of which is to cause the wheel 24 to be rotated to a more convenient storage position.

To extend the landing gear it is merely necessary to reverse the fluid connections so that fluid under pressure is supplied to the pressure line 73 of the actuator 66 to cause the piston 69 to move into the cylinder 67 and produce a force moment tending to rotate the wheel support assembly 18 around the longitudinal axis 28 in a counter clock-wise direction when viewed from the outer end of the strut 10. At the same time fluid under pressure is supplied to the pressure line 60 of the actuator 50 to cause the cylinder 51 to move down along the strut 11. This causes the landing gear to move to the fully extended position shown in Figures 1 through 3. Of course, the pressure lines 55 and 72 should be connected to the reservoir return at this time to permit free movement of the two actuators 50 and 66.

An inspection of Figure 5 will show that the various elements are folded in such a manner that they extend substantially along each other and thereby take up less storage space within the fuselage of the aircraft than has been present in past structures. Also those skilled in the art will recognize that the use of pivotal end connections for all of the links enables the manufacture of a sturdy dependable structure which can adequately meet the rigorous needs of aircraft installations.

Although the preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed descriptions are determinative of the scope of the invention.

I claim:

1. A retractable landing gear comprising a frame, a rigid elongated strut having one end pivotally connected to said frame for rotation between a retracted position and an extended position, a wheel support assembly journalled on the other end of said strut for rotation relative thereto about a first axis, a pair of drag links, a first pivot connecting one link to said assembly for rotation relative thereto about a second axis non-parallel to said first axis, a swivel connecting the other of said links to said frame, means connecting said links together permitting movement of said first pivot generally toward said swivel and power means associated with said assembly effecting rotation thereof about said first axis and the consequential movement of said first pivot toward said swivel.

2. A retractable landing gear comprising a frame, a rigid elongated strut having one end pivotally connected to said frame for rotation between a retracted position and an extended position, a wheel support assembly journalled on the other end of said strut for rotation relative thereto about a first axis, a pair of drag links, a first pivot connecting one link to said assembly for rotation relative thereto about a second axis non-parallel to said first axis, a swivel connecting the other of said links to said frame, means connecting said links together permitting movement of said first pivot generally toward said swivel, and an actuator connected between said assembly and strut operable to produce rotation therebetween about said first axis and the consequential movement of said first pivot toward said swivel.

3. A retractable landing gear comprising a frame, a wheel support assembly for said frame, a rigid elongated strut having one end pivotally connected to said frame for rotation of the strut between retracted and extended positions, said assembly being journalled on the other end of said strut for rotation relative thereto about a first axis, a pair of elongated drag links, a first pivot connecting the inner ends of said links, a second pivot connecting the outer end of one of said links to said assembly for rotation relative thereto about a second axis non-parallel to said first axis, a swivel connecting the outer end of the other of said links to said frame, the axis of said first pivot being non-perpendicular to a plane containing said second axis and the longitudinal axis of said one link, said first pivot permitting movement between said links wherein said second pivot moves generally toward said swivel, a first power means associated with said links effecting said movement of said second pivot towards said swivel, and second power means associated with said assembly effecting rotation thereof about said first axis.

4. A retractable landing gear comprising an aircraft frame, a pair of rigid elongated struts pivoted at their upper ends of said frame on spaced points for rotation relative thereto about a first axis, means connecting the lower ends of said struts so that they move in unison about said first axis, a wheel support assembly journalled on one of said struts for rotation relative thereto about a second axis non-parallel relative to said first axis, a pair of drag links pivotally connected for relative rotation about a third axis, a first pivot connecting one of said links to one of said struts for rotation relative thereto about a fourth axis non-parallel to said second axis and non-perpendicular relative to a plane containing said third axis and the longitudinal axis of said one link, and swivel means connecting the other of said links to said frame at a point spaced from said struts.

5. A retractable landing gear comprising an aircraft frame, a pair of rigid elongated struts pivoted at their upper ends of said frame on spaced points for rotation relative thereto about a first axis, means connecting the lower ends of said struts so that they move in unison about said first axis, a wheel support assembly journalled on one of said struts for rotation relative thereto about a second axis non-parallel relative to said first axis, a pair of drag links pivotally connected for relative rotation about a third axis, a first pivot connecting one of said links to one of said struts for rotation relative thereto about a fourth axis non-parallel to said second axis and non-perpendicular relative to a plane containing said third axis and the longitudinal axis of said one link, swivel means connecting the other of said links to said frame at a point spaced from said struts, and power means operably connected to one of said links operable to produce a force moment thereon having a component of the force moment in a plane containing said third axis.

6. A retractable landing gear comprising a frame, a rigid elongated strut pivotally connected to said frame for rotation between retracted and extended positions, a wheel support assembly mounted on said strut, a pair of elongated folding drag links pivotally interconnected to rotate about a first axis, end connections between one drag link and said assembly and the other drag link and said frame, said drag links being aligned with each other and inclined relative to said strut when said strut is in said extended position, a fluid motor surrounding said strut including a cylinder movable along the longitudinal axis thereof under the influence of fluid under pressure, and a bar connected between said cylinder and drag links producing rotation between said links about said first axis upon movement of said cylinder along said strut.

7. A retractable landing gear comprising a frame, a rigid elongated strut pivotally connected to said frame for rotation between a retracted and extended position, a wheel support assembly mounted on said strut, a pair of elongated folding drag links pivotally connected at their inner ends to rotate about a first axis, a pivotal connection between the outer end of one of said links and said assembly, a pivotal connection between the outer end of the other of said links and said frame, said links being aligned with each other and inclined relative to said strut when said strut is in said extended position, a fluid motor on said strut including a cylinder movable longitudinal thereof under the influence of fluid under pressure, and a bar connected between said cylinder and drag links producing rotation between said links about said first axis upon movement of said cylinder longitudinal of said strut.

8. A retractable landing gear comprising a frame, a rigid elongated strut having its upper end on said frame for rotation between a retracted position and an extended position, a wheel support assembly on the lower end of said strut, a pair of elongated folding drag links connected together to fold about a first axis, end connections between one drag link and said assembly and the other drag link and said frame, said drag links being aligned with each other and inclined relative to said strut when said strut is in said extended position, a fluid motor surrounding said strut including a cylinder movable along the longitudinal axis thereof under the influence of fluid under pressure, and a bar connected between said cylinder and drag links producing rotation between said links about said first axis upon movement of said cylinder along said strut, said bar extending substantially perpendicular to said longitudinal axis when said strut is in said extended position.

9. A retractable landing gear comprising a frame, a rigid elongated strut journalled on said frame for rotation between a retracted position and an extended position, a wheel support assembly journalled on said strut for rotation around a first axis, a pair of elongated folding drag links connected together to fold about a second axis, an end connection between one drag link and said frame, a second pivot connecting the other of said drag links and said support assembly for relative rotation about a third axis non-parallel to said first axis and non-perpendicular to a plane containing said second axis and the longitudinal axis of said other drag link, said drag links being aligned with each other and inclined relative to said strut when said strut is in said extended position, a fluid motor on said strut including a cylinder movable along the longitudinal axis thereof under the influence of fluid under pressure, and a bar connected between said cylinder and drag links producing rotation between said links about said second axis upon movement of said cylinder along said strut.

10. A retractable landing gear comprising a frame, a rigid elongated strut journalled on said frame for rotation between a retracted position and an extended position, a wheel support assembly journalled on said strut for rotation around a first axis, a pair of elongated folding drag links connected together to fold about a second axis, an end connection between one drag link and said frame, a second pivot connecting the other of said drag links and said support assembly for relative rotation about a third axis non-parallel to said first axis and non-perpendicular to a plane containing said second axis and the longitudinal axis of said other drag link, said drag links being aligned with each other and inclined relative to said strut when said strut is in said extended position, a fluid motor on said strut including a cylinder movable along the longitudinal axis thereof under the influence of fluid under pressure, a bar connecting said cylinder and said links, and power means associated with said support assembly operable to rotate it about said first axis.

11. A retractable landing gear comprising a frame, a rigid elongated strut journalled on said frame for rotation between a retracted position and an extended position, a wheel support assembly journalled on said strut for rotation around a first axis, a pair of elongated folding drag links connected together to fold about a second axis, an end connection between one drag link and said frame, a second pivot connecting the other of said drag links and said support assembly for relative rotation about a third axis non-parallel to said first axis and non-perpendicular to a plane containing said second axis and the longitudinal axis of said other drag link, said drag links being aligned with each other and inclined relative to said strut when said strut is in said extended position, a fluid motor on said strut including a cylinder movable along the longitudinal axis thereof under the influence of fluid under pressure, a bar connecting said cylinder and said other link extending substantially perpendicular to said longitudinal axis when said strut is in said extended position, and power means associated with said support assembly operable to rotate it about said first axis.

12. A retractable landing gear comprising a frame, elongated strut means journalled on said frame for rotation between a retracted position and an extended position, a wheel support assembly journalled on said strut means for rotation relative thereto about the longitudinal first axis thereof, a pair of drag links, a first pivot connecting one link to said assembly for rotation relative thereto about a second axis non-parallel relative to said longitudinal first axis, a second pivot connecting said links for relative rotation about a third axis non-parallel relative to said longitudinal first axis, a swivel connecting the other of said links to said frame, a bar connected at one end to one of said drag links and at the other end to said strut means, the connection between said bar and strut means permitting movement therealong, a first actuator connected to said bar operable to move it along said strut means, and a second actuator operably connected between said assembly and strut operable to produce relative rotation therebetween about said longitudinal first axis.

References Cited in the file of this patent

UNITED STATES PATENTS

| | | |
|---|---|---|
| 2,277,896 | Albright | Mar. 31, 1942 |
| 2,323,367 | Bertran | July 6, 1943 |
| 2,474,694 | Saulnier | June 28, 1949 |